US010072973B2

(12) United States Patent
Maass et al.

(10) Patent No.: US 10,072,973 B2
(45) Date of Patent: Sep. 11, 2018

(54) LIGHT INFORMATION SENSING SYSTEM AND METHOD FOR DETERMINING AN AMOUNT OF AMBIENT LIGHT EXPOSURE EXPERIENCED BY A SUBJECT

(71) Applicant: KONINKLIJKE PHILIPS N.V., Eindhoven (NL)

(72) Inventors: Henning Maass, Waalre (NL); Guido Josef Müsch, Erkelenz (DE); Xavier Louis Marie Antoine Aubert, Brussels (BE); Elsa Inger Stapel Møst, Eindhoven (NL); Leo Jan Velthoven, Wintelre (NL); Folke Charlotte Noertemann, Raeren (BE); Mauro Barbieri, Eindhoven (NL); Enrique Antonio Gil Ponce, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 158 days.

(21) Appl. No.: 15/301,028

(22) PCT Filed: Mar. 30, 2015

(86) PCT No.: PCT/IB2015/052322
§ 371 (c)(1),
(2) Date: Sep. 30, 2016

(87) PCT Pub. No.: WO2015/151007
PCT Pub. Date: Oct. 8, 2015

(65) Prior Publication Data
US 2017/0038250 A1 Feb. 9, 2017

Related U.S. Application Data

(60) Provisional application No. 61/974,488, filed on Apr. 3, 2014.

(51) Int. Cl.
*G01J 1/42* (2006.01)
*G01J 1/02* (2006.01)

(52) U.S. Cl.
CPC .......... *G01J 1/4204* (2013.01); *G01J 1/0219* (2013.01); *G01J 1/0228* (2013.01); *G01J 1/4228* (2013.01); *G01J 2001/4266* (2013.01)

(58) Field of Classification Search
CPC .......... A61N 5/0618; A61N 2005/0647; A61B 5/4806; A61B 5/4848; G01J 1/0228; G01J 1/4204; G01J 1/0219; G16H 50/50
(Continued)

(56) References Cited

U.S. PATENT DOCUMENTS 7,526,280 B2    4/2009  Jung
9,797,768 B2 *  10/2017 Maass .................. G01J 1/0228
(Continued)

FOREIGN PATENT DOCUMENTS

CN    CN1574662 A    2/2005
EP      2568266 A1    3/2013
(Continued)

OTHER PUBLICATIONS

Kristof Van Laerhoven et al., "Sustained Logging and Discrimination of Sleep Postures with Low-Level, Wrist-Worn Sensors", Wearable Computers, 2008. ISWC 2008. 12th IEEE International Symposium on, IEEE, Piscataway, NJ, USA, Sep. 28, 2008 (Sep. 28, 2008), pp. 69-76, XP031452986,.
(Continued)

*Primary Examiner* — Que T Le
(74) *Attorney, Agent, or Firm* — Michael W. Haas

(57) ABSTRACT

The present disclosure pertains to a light sensing system configured to determine an amount of ambient light exposure experienced by a subject. The present invention wirelessly exchanges light information between different wear-
(Continued)

able devices of the same user and/or between devices of different users. Local and/or central light profile databases are built-up by the system and are shared between the devices so that light data that is typical for a location at a specific time of day and year can be used to estimate current ambient light levels for situations in which no measurement can be taken.

18 Claims, 6 Drawing Sheets

(58) Field of Classification Search
USPC .......................... 250/214 AL, 214 R, 214.1
See application file for complete search history.

(56) References Cited

U.S. PATENT DOCUMENTS

| | | |
|---|---|---|
| 2006/0224051 A1 | 10/2006 | Teller |
| 2007/0265796 A1 | 11/2007 | Taylor |
| 2014/0061486 A1 | 3/2014 | Bao |

FOREIGN PATENT DOCUMENTS

| | | |
|---|---|---|
| WO | WO2012095712 A1 | 7/2012 |
| WO | WO2014097020 A2 | 6/2014 |
| WO | WO2014110419 A1 | 7/2014 |

OTHER PUBLICATIONS

Lockley, S. et al., "Short-Wavelength Sensitivity for the Direct Effects of Light on Alertness, Vigilance, and the Waking Electroencephalogram in Humans", Sleep, vol. 29, No. 2, 2006.

Terman M. et al., "Light Therapy for Seasonal and Nonseasonal Depression: Efficacy, Protocol, Safety, and Side Effects", CNS Spectrums—Aug. 2005, vol. 10, No. 8, pp. 647-663.

Philips Respironics, "Twice as easy—Ambulatory Actigraphy Devices that Collect and Download Continuous, Objective Long-Term Sleep/Wake Data", Actigraphy Product Brochure, 2012, from http://actiwatch.respironics.com/.

\* cited by examiner

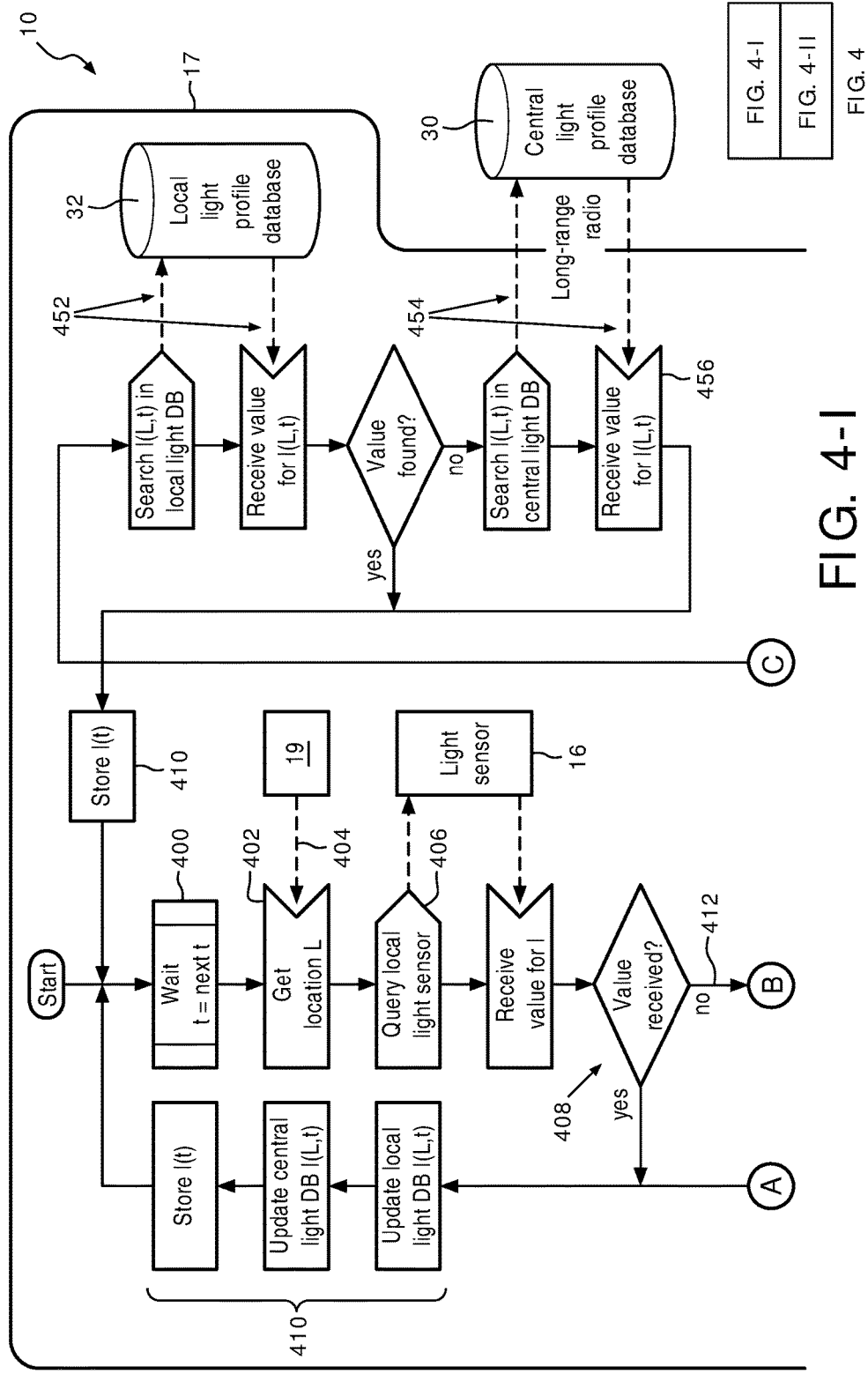
FIG. 4-I

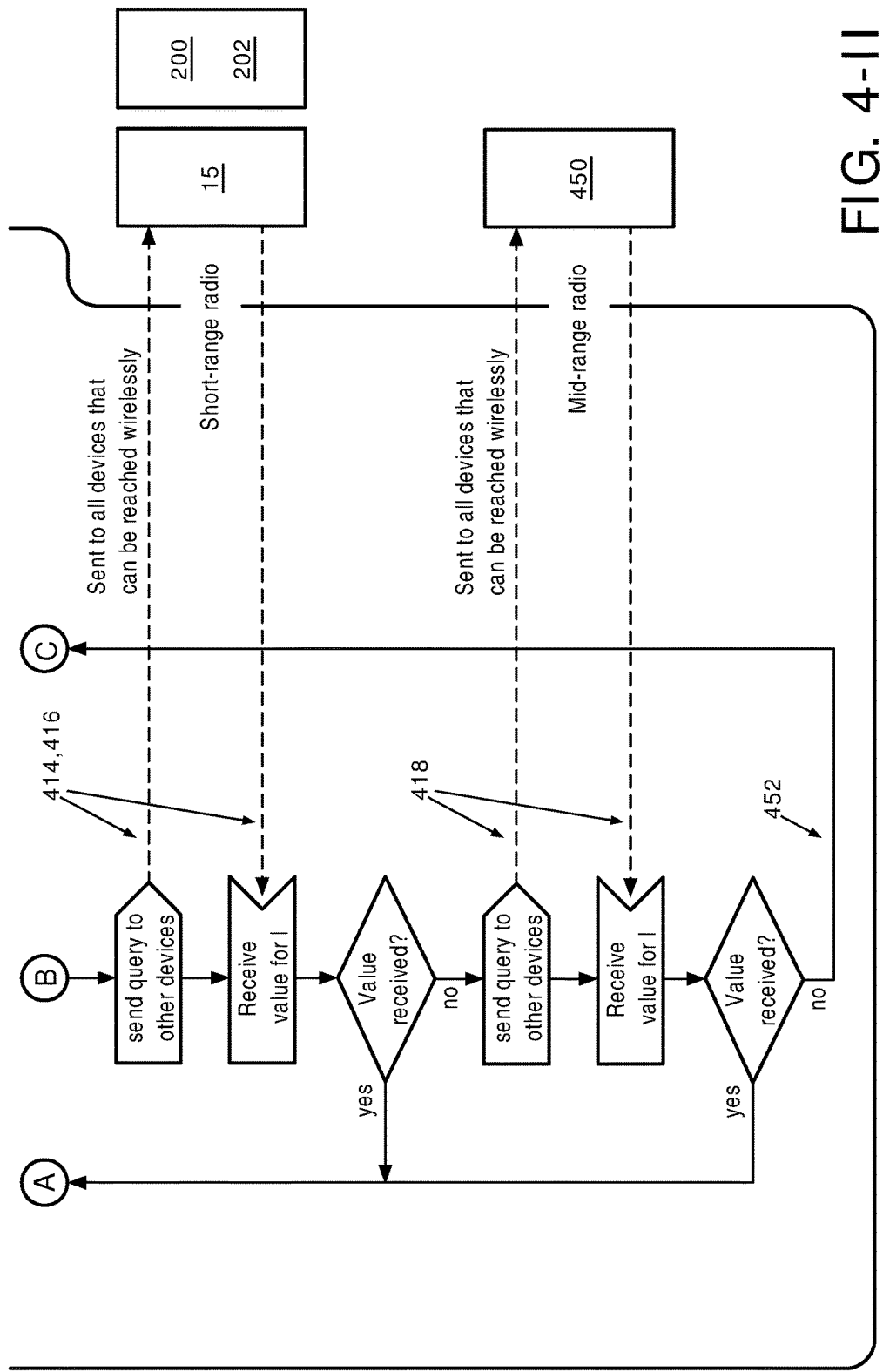
FIG. 4-II

LIGHT INFORMATION SENSING SYSTEM AND METHOD FOR DETERMINING AN AMOUNT OF AMBIENT LIGHT EXPOSURE EXPERIENCED BY A SUBJECT

CROSS-REFERENCE TO RELATED APPLICATIONS

This patent application claims the priority benefit under 35 U.S.C. § 371 of international patent application no. PCT/EP2014/052322, filed Mar. 30, 2015, which claims the priority benefit under 35 U.S.C. § 119(e) of U.S. Provisional Application No. 61/974,488 filed on Apr. 3, 2014, the contents of which are herein incorporated by reference.

BACKGROUND

1. Field

The present disclosure pertains to a light sensing system configured to determine an amount of ambient light exposure experienced by a subject.

2. Description of the Related Art

Wearable light sensing devices such as wrist-worn actigraphy devices are known. These devices are frequently used for assessing ambient light levels. Typically, these devices are easily covered by clothing (e.g., sleeves) making the light measurements unreliable for post-processing such as during estimation of a human circadian phase.

SUMMARY

Accordingly, one aspect of the present disclosure relates to a light sensing system configured to determine an amount of ambient light exposure experienced by a subject. The system comprises a primary light sensor, a secondary light sensor, one or more physical computer processors, and/or other components. The primary light sensor is carried by a first device worn by the subject. The primary light sensor is configured to generate output signals conveying primary light exposure information related to an amount of ambient light to which the primary light sensor is exposed. The secondary light sensor is carried by a second device. The second device is physically separate and unconnected from the first device. The second device is associated with the subject. The secondary light sensor is configured to generate output signals conveying secondary light exposure information related to an amount of ambient light to which the secondary light sensor is exposed. The one or more physical computer processors are configured by computer readable instructions to: if the primary light exposure information for a given time indicates that the primary light sensor is exposed to substantial ambient light, determine the amount of ambient light exposure experienced by the subject for the given time based on the primary light exposure information; and if the primary light exposure information for the given time indicates that the primary light sensor is not exposed to substantial ambient light, determine the amount of ambient light exposure experienced by the subject for the given time based on the secondary light exposure information.

Another aspect of the present disclosure relates to a method for determining an amount of ambient light exposure experienced by a subject with a light sensing system. The system comprises a primary light sensor, a secondary light sensor, one or more physical computer processors, and/or other components. The method comprises: carrying the primary light sensor with a first device worn by the subject; generating, with the primary light sensor, output signals conveying primary light exposure information related to an amount of ambient light to which the primary light sensor is exposed; carrying the secondary light sensor with a second device, the second device being physically separate and unconnected from the first device, and being associated with the subject; generating, with the secondary light sensor, output signals conveying secondary light exposure information related to an amount of ambient light to which the secondary light sensor is exposed; if the primary light exposure information for a given time indicates that the primary light sensor is exposed to substantial ambient light, determining the amount of ambient light exposure experienced by the subject for the given time based on the primary light exposure information; and if the primary light exposure information for the given time indicates that the primary light sensor is not exposed to substantial ambient light, determining the amount of ambient light exposure experienced by the subject for the given time based on the secondary light exposure information.

Still another aspect of the present disclosure relates to a light sensing system configured to determine an amount of ambient light exposure experienced by a subject. The system comprising: primary means, carried by a first device worn by the subject, for generating output signals conveying primary light exposure information related to an amount of ambient light to which the primary means is exposed; secondary means, carried by a second device, the second device being physically separate and unconnected from the first device, and being associated with the subject, for generating output signals conveying secondary light exposure information related to an amount of ambient light to which the secondary means is exposed; means for, if the primary light exposure information for a given time indicates that the primary means is exposed to substantial ambient light, determining the amount of ambient light exposure experienced by the subject for the given time based on the primary light exposure information; and means for, if the primary light exposure information for the given time indicates that the primary means is not exposed to substantial ambient light, determining the amount of ambient light exposure experienced by the subject for the given time based on the secondary light exposure information.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

FIG. 4 illustrates a second flow chart that describes the system.

DETAILED DESCRIPTION OF EXEMPLARY EMBODIMENTS

Figure 1:
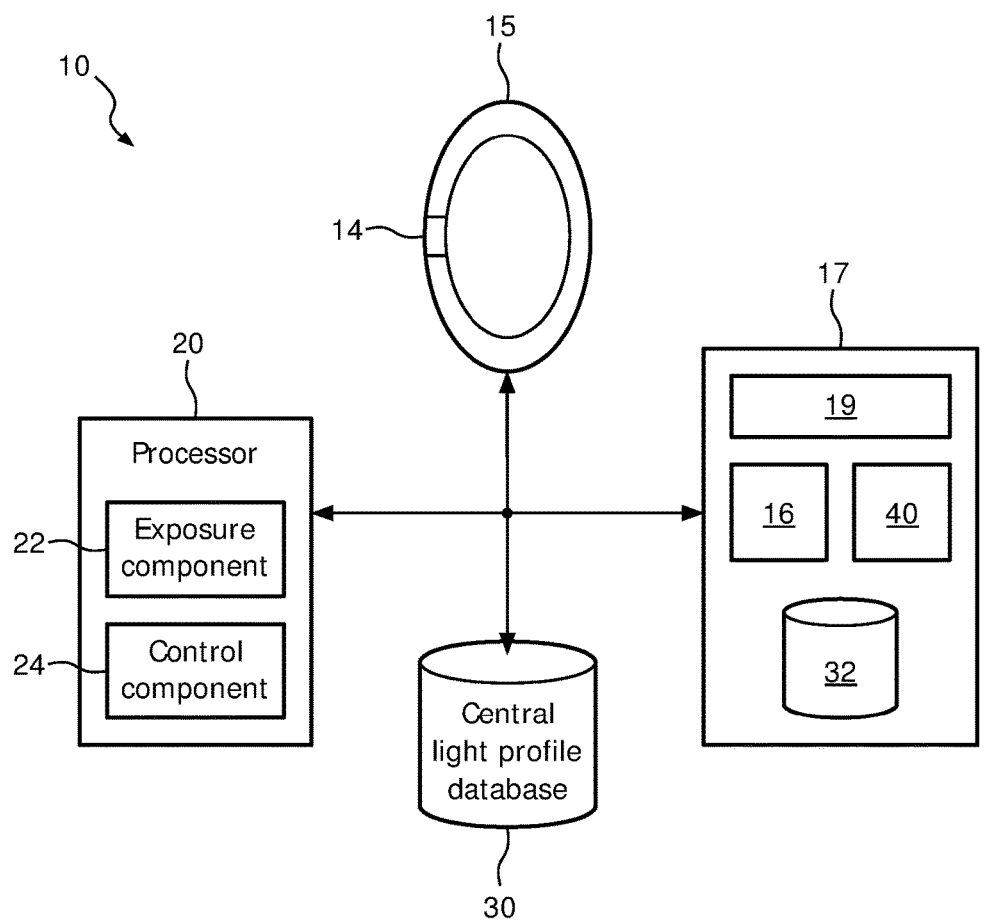
FIG. 1 illustrates a light sensing system configured to determine an amount of ambient light exposure experienced by a subject.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 illustrates a light sensing system 10 configured to determine an amount of ambient light exposure experienced by a subject. System 10 includes one or more of a primary light sensor 14 carried by a device 15 worn by the subject, a secondary light sensor 16 carried by a second device 17 associated with the subject, a physical computer processor 20, a central light profile database 30, and/or other components.

Exposure to light is a key mechanism that enables a proper synchronization of the body clock with the solar day cycle. Timing, duration, intensity, spectral composition, and/or other parameters of light exposure have an impact on the entrainment of a person to a 24-hour circadian rhythm. Restorative sleep occurs at specific times on the body clock. For certain people who have a phase shift of their internal body clock relative to the social schedules around them, exposure to bright light at pre-defined times may be used to shift their body clock forward and/or backward to better align it with social needs. Timed and/or regular exposure to bright light is also an effective treatment for seasonal affective disorder (winter blues). The assessment of light levels to which a person is exposed over the course of multiple days and/or weeks is an important instrument in the diagnosis of mood and/or sleep disorders.

Existing actigraphy devices easily become covered by clothing (e.g., sleeves) making the light measurements unreliable for post-processing (e.g., estimation of a human circadian phase). Smartphones are not always exposed to the environment but are stowed away in pockets and/or bags so they occasionally capture the light levels a user associated with the mobile phone is exposed to. For an analysis of a person's light exposure and/or an analysis of longitudinal light patterns (for example) it is desirable to regularly and/or repeatably obtain measurements of ambient light as frequently as possible, for example, about once or twice a minute.

System 10 senses ambient light levels via light sensors carried by devices worn by the subject (e.g., device 15), sensors included in computing devices associated with the subject (e.g., device 17 which may be a smartphone and/or other devices), sensors worn by and/or associated with other users, dedicated stationary light measurement devices not associated with a particular user installed at frequently visited locations, and/or other sensors. If (primary) light exposure information for a given time indicates that a light sensor carried by device 15 worn by the subject is exposed to substantial ambient light, system 10 determines the amount of ambient light exposure experienced by the subject for the given time based on the primary light exposure information. In some embodiments, system 10 determines whether a given light sensor is exposed to substantial ambient light based on output signals from a proximity sensor configured to detect occlusions, based on output signals from the light sensor that indicate unusually low light levels (e.g., unusually low for a given time of day, geographic location, etc.), and/or other information. If the primary light exposure information for the given time indicates that the light sensor carried by device 15 is not exposed to substantial ambient light, system 10 determines the amount of ambient light exposure experienced by the subject for the given time based on (secondary) light exposure information from a sensor (e.g., sensor 16) carried by a device such as a smartphone associated with the subject. If the light exposure information for the given time indicates that the light sensor carried by the device associated with the subject is not exposed to substantial ambient light (e.g., the smartphone is in someone's pocket), system 10 determines the amount of ambient light exposure experienced by the subject for the given time based on light exposure information from sensors associated with other users, sensors associated with other devices (e.g. a stationary light sensor positioned at a particular location in a city), and/or other sources. System 10 is configured such that, if a single device that carries a light sensor is uncovered at a given moment, the ambient light exposure information from the uncovered device may be used to determine an amount of ambient light exposure experienced by other users in the area whose devices are covered at that given moment.

System 10 includes light profile databases (e.g., electronic storage 32, central light profile database 30 shown in FIG. 1) configured to store light exposure data over time together with, time of day, date, geographic location, and/or other information conveyed by output signals from one of more light sensors worn by and/or associated with one or more users. These light profile databases may be used by system 10 to obtain typical light exposure information for a given location whenever light sensors worn by (e.g., sensor 14) and/or associated with (e.g., sensor 16) a user are covered and no other uncovered light sensors (e.g., associated with a nearby user and/or a stationary location) are able to provide the information. The light profile databases may be located on the device (e.g., a smartphone) associated with the user and configured to collect information for a single user (e.g., electronic storage 32), and/or may be a central (e.g., server) database configured to collect information from multiple users (e.g., central light profile database 30). The local and/or central database may be queried to obtain typical light profile data for a specific time of day, date, and/or location when no other light sensors are available (e.g., uncovered) for obtaining a current light exposure information, for example.

Device 15 is configured to be worn by the subject. Device 15 may be worn by the subject such that it is exposed to ambient light while it is being worn. Device 15 may be located on an outer surface of the clothing of subject 12, located on the body of subject 12 in an area that is not typically clothed, and/or located in other areas. In some embodiments, device 15 may be and/or include one or more of a wristband, earphones, an identification badge, jewelry, a button, a hair band, a hair clip, glasses, a bracelet, a belt, artificial finger nails, a pin, a piercing, a tie, a clip, an amulet, a watch, a headset, a ring, a scarf, a handbag, a mobile phone pouch, textiles, contact lenses, and/or other devices worn by the subject. Device 15 is configured to carry primary light sensor 14. Carrying primary light sensor 14 may include being removably coupled with, surrounding, enclosing, encasing, physically supporting, clamping to, hooking to, being permanently coupled with primary light sensor 14, and/or other forms of carrying primary light sensor 14. In some embodiments, device 15 may include primary light sensor 14, processor 20, at least one component of processor 20 (described below), and/or other components.

Device 17 is configured to carry secondary light sensor 16. Device 17 is associated with the subject. Device 17 is physically separate and unconnected from device 15. In some embodiments, device 17 is a client computing device. In some embodiments, device 17 is a smartphone associated with the subject. In some embodiments, device 17 includes a geographic location sensor (e.g., GPS), a timer, a clock, and/or other sensors 19; electronic storage 32; a user interface 40; and/or other components. In some embodiments, device 17 may include processor 20, at least one component of processor 20 (described below), and/or other components.

Electronic storage 32 comprises electronic storage media that electronically stores information. The electronic storage media of electronic storage 32 may comprise one or both of system storage that is provided integrally (i.e., substantially non-removable) with device 17 and/or removable storage that is removably connectable to device 17 via, for example, a port (e.g., a USB port, a firewire port, etc.) or a drive (e.g., a disk drive, etc.). Electronic storage 32 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 32 may store software algorithms, information (e.g., an amount of light exposure for a given time) determined by processor 20, and/or other information that enables system 10 to function properly. Electronic storage 32 may be (in whole or in part) a separate component within system 10, or electronic storage 32 may be provided (in whole or in part) integrally with one or more other components of system 10 (e.g., device 17).

In some embodiments, electronic storage 32 may be and/or include a local light profile database configured to store primary light exposure information related to an amount of ambient light to which primary light sensor 14 is exposed, secondary light exposure information related to an amount of ambient light to which secondary light sensor 16 is exposed, an amount of ambient light exposure experienced by the subject for one or more given times, and/or other information.

User interface 40 may be configured to provide an interface between device 17 and the user through which the user may provide information to and receive information from system 10. This enables data, cues, results, and/or instructions and any other communicable items, collectively referred to as "information," to be communicated between the user and system 10. Examples of interface devices suitable for inclusion in user interface 40 include a touch screen, a keypad, touch sensitive and/or physical buttons, switches, a keyboard, knobs, levers, a display, speakers, a microphone, an indicator light, an audible alarm, a printer, and/or other interface devices. In some embodiments, user interface 40 includes a plurality of separate interfaces. In some embodiments, user interface 40 includes at least one interface that is provided integrally with device 17.

It is to be understood that other communication techniques, either hard-wired or wireless, are also contemplated by the present disclosure as user interface 40. For example, the present disclosure contemplates that user interface 40 may be integrated with a removable storage interface provided by device 17. In this example, information may be loaded into device 17 from removable storage (e.g., a smart card, a flash drive, a removable disk) that enables the user to customize the implementation of device 17. Other exemplary input devices and techniques adapted for use with device 17 as user interface 40 include, but are not limited to, an RS-232 port, RF link, an IR link, modem (telephone, cable or other). In short, any technique for communicating information with device 17 and/or other components of system 10 is contemplated by the present disclosure as user interface 40.

Primary light sensor 14 is configured to generate output signals conveying primary light exposure information related to an amount of ambient light to which primary light sensor 14 is exposed. Secondary light sensor 16 is configured to generate output signals conveying secondary light exposure information related to an amount of ambient light to which secondary light sensor 16 is exposed. The primary and/or secondary light exposure information includes one or more of an illuminance, the spectrum of ambient light, a portion of the spectrum of ambient light (e.g., the red, green, and blue portions of the visible spectrum), an intensity of the ambient light, a date, a time of day, a geographic location of the subject, an indication of whether the subject is indoors and/or outdoors, an orientation (e.g., from an electronic compass), and/or other information.

System 10 may include other light sensors carried by other devices. For example, system 10 may include dedicated stationary light measurement devices not associated with a particular user installed at frequently visited locations. These devices may generate output signals conveying light exposure information related to an amount of ambient light to which a stationary light sensor is exposed. The stationary light measurement devices may include a local light profile database for the location where they are installed. As another example, system 10 may include and/or communicate with light sensors embedded into devices that are equipped with short-range radio technologies (e.g., RFID, NFC, BLE, Zigbee) and occasionally communicate with a user's smartphone for various applications (e.g. ticketing, contactless payment, access control, etc.) During these transactions the user's smartphone may obtain current light exposure information from the short-range radio equipped devices.

In some embodiments, the light sensors (e.g., light sensors worn by users such as primary light sensor 14, light sensors included in computing devices associated with users such as secondary light sensor 16, stationary light measurement devices) described herein may be and/or include one or more of an active pixel sensor, a photoresistor, a photovoltaic cell, a photodiode, a photomultiplier, a phototransistor, a photodetector, a camera, and/or other sensors.

Central light profile database 30 is configured to store light exposure information from one or more users. Central light profile database 30 may be configured to store light exposure data over time together with, time of day, date, location, and/or other information for one or more users. In some embodiments, central light profile database 30 may be controlled to store information by processor 20. Central light profile database may be used by processor 20 to obtain typical light information for a given location (for example) whenever light sensors worn by (e.g., sensor 14) and/or associated with (e.g., sensor 16) a user are covered and no other uncovered light sensors (e.g., associated with a nearby user and/or a stationary location) are able to provide the needed information. In some embodiments, central light profile database 30 is a server configured to collect information from multiple users. Central light profile database 30 may be queried by the device associated with the user (e.g., device 17 which may be a smartphone) to obtain typical light profile data for a specific time of day, date, and/or location even if that device has not visited that location previously and/or if no other wearable and/or stationary device is available (e.g., uncovered) for obtaining current light exposure information, for example.

Processor 20 is configured to execute one or more computer program components. The one or more computer program components may comprise one or more of an exposure component 22, a control component 24, and/or other components. Processor 20 may be configured to execute components 22, 24, and/or other components by software; hardware; firmware; some combination of software, hardware, and/or firmware; and/or other mechanisms for configuring processing capabilities on processor 20.

It should be appreciated that although components 22 and 24 are illustrated in FIG. 1 as being co-located within a single processing unit, in embodiments in which processor 20 comprises multiple processing units, one or more of components 22, 24, and/or other components may be located remotely from the other components (e.g., in a remotely located server, in device 15, in device 17). The description of the functionality provided by the different components 22, 24, and/or other components described below is for illustrative purposes, and is not intended to be limiting, as any of components 22 and/or 24 may provide more or less functionality than is described. For example, one or more of components 22 and/or 24 may be eliminated, and some or all of its functionality may be provided by other components 22 and/or 24. As another example, processor 20 may be configured to execute one or more additional components that may perform some or all of the functionality attributed below to one of components 22 and/or 24.

Exposure component 22 is configured to determine whether primary light sensor 14, secondary light sensor 16, and/or other light sensors are exposed to substantial ambient light at a given time. Exposure component 22 is configured to determine whether the light sensors are exposed to substantial ambient light at the given time based on the primary light exposure information, the secondary light exposure information, and/or other information for the given time. In some embodiments, exposure component 22 is configured to determine whether a given light sensor is exposed to substantial ambient light at a given time by a method similar to and/or the same as the method described in U.S. Provisional Patent Application No. 61/739,805 filed Dec. 20, 2012, and entitled, "Light Sensing Device For Sensing Ambient Light Intensity," which is hereby incorporated herein by reference in its entirety.

Exposure component 22 is configured to determine the amount of ambient light exposure experienced by the subject for the given time. Exposure component 22 is controlled by control component 24 to determine the amount of ambient light exposure experienced by the subject for the given time based on the primary light exposure information, the secondary light exposure information, and/or other light exposure information. If the primary light exposure information for a given time indicates that primary light sensor 14 is exposed to substantial ambient light, control component 24 controls exposure component 22 to determine the amount of ambient light exposure experienced by the subject for the given time based on the primary light exposure information. This determination is made without regard for the secondary light exposure information. If the primary light exposure information for the given time indicates that primary light sensor 14 is not exposed to substantial ambient light, control component 24 controls exposure component 22 to determine the amount of ambient light exposure experienced by the subject for the given time based on the secondary light exposure information. This determination is made without regard for the primary light exposure information. If both the primary and secondary light exposure information indicates that primary light sensor 14 and secondary light sensor 16 are not exposed to ambient light, control component 24 controls exposure component 22 to determine the amount of ambient light exposure experienced by the subject for the given time based on information from stationary sensors described above, nearby sensors carried by devices worn by and/or associated with other users, and/or other sensors.

Control component 24 is configured to control exposure component 22 to determine the amount of ambient light exposure experienced by the subject for the given time based on whether a particular light sensor is exposed to substantial ambient light at the given time. Control component 24 is configured to cause exposure component 22 to use the information from primary light sensor 14 as a default when determining the amount of ambient light exposure experienced by the subject for the given time. Control component 24 is configured to cause exposure component 22 to use information from secondary light sensor 16 as a second option if primary light sensor 14 is not exposed to ambient light. If the secondary light exposure information for a given time indicates that secondary light sensor 16 is not exposed to substantial ambient light, control component 24 is configured to cause exposure component 22 to obtain light exposure information for the given time from other sources. These other sources may include light the sensors embedded in other devices worn and/or associated with other users, the fixed light sensors placed at various locations throughout a city, for example, light exposure information databases, and/or other sources.

For example, if the secondary light exposure information for the given time indicates that secondary light sensor 16 is not exposed to substantial ambient light (in addition to primary light sensor 14 not being exposed to substantial ambient light), control component 24 may cause exposure component 22 to obtain light exposure information from a light exposure information database that corresponds to one or more of a date, a time of day, or a geographic location in the primary and/or secondary light exposure information. Control component 24 may cause exposure component 22 to determine the amount of ambient light exposure experienced by the subject based on the database light exposure information.

In some embodiments, if the primary and secondary light exposure information for the given time indicates that primary light sensor 14 and secondary light sensor 16 are not exposed to substantial ambient light, control component 24 may determine which alternate light sensor information to use based on a geographic location of the subject at a given time, the locations of nearby sensors carried by devices worn by and/or associated with other users, the locations of the stationary light sensing devices, and/or other information. Control component 24 may be configured to determine the next geographically closest light sensor (e.g., a sensor carried by a device worn by and/or associated with a close by user, a sensor carried by a close by stationary device) and cause exposure component 22 to determine the amount of ambient light exposure experienced by the subject for the given time based on the information from the next geographically closest light sensor. In some embodiments, control component 24 may determine that there are no available geographically close light sensors and determine the amount of ambient light exposure experienced by the subject for the given time based on information stored in a local light profile database (e.g., electronic storage 32) and/or central light profile database 30.

In some embodiments, control component 24 is configured to facilitate electronic storage of the primary light exposure information, the secondary light exposure information, the amount of ambient light exposure experienced by the subject for the given time and/or date, and/or other information. Control component 24 may be configured to facilitate electronic storage in electronic storage (e.g., local light database) 32, in central light profile database 30, and/or in other locations. For example, control component 24 may facilitate electronic storage of the amount of ambient light experienced by the subject for the given time in electronic storage 32. Control component may facilitate electronic storage of light exposure information (e.g., including light intensity, a date, a time of day, a geographic location, etc.) from light sensors worn by and/or associated with one or more users (e.g., primary light sensor 14, secondary light sensor 16), light sensors not worn by and/or associated with one or more users (e.g., stationary light sensors located throughout a city), and/or other light sensors.

In some embodiments, control component 24 is configured such that if output signals from a given light sensor indicate a low light level but other nearby sensors return higher light levels, control component 24 concludes that the given light sensor is covered and causes exposure component 22 to determine the amount of ambient light exposure experienced by the subject for the given time based on the information from the other nearby sensors.

Figure 2:
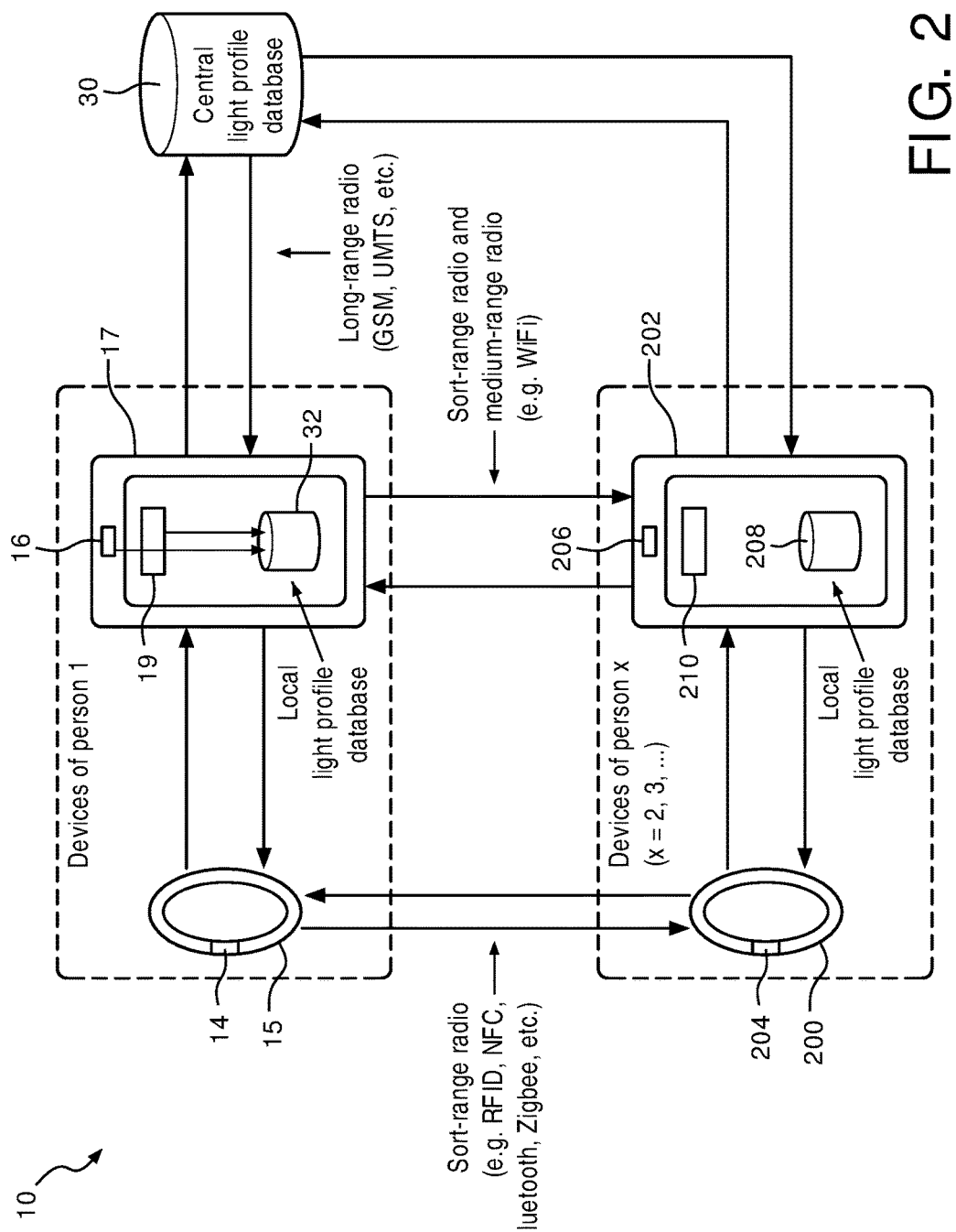
FIG. 2 illustrates one possible embodiment of the system.

FIG. 2 illustrates one possible embodiment of system 10. The subject wears one or more devices 15. One or more devices 17 may be associated with the subject. A second user wears a second wearable device 200 and is associated with device 202. In FIG. 2 one wearable device 15, 200 and one associated device 17, 202 per user are shown, but this is not intended to be limiting. An individual user may wear and/or be associated with several devices. The number of users is not limited to two. System 10 may include any number of users and their worn and/or associated devices. The individual devices may be configured to communicate with each other and/or central light profile database 30.

The devices 15, 17, 200, 202 include light sensors 14, 16, 204, 206 and wireless communication technology configured to facilitate communication, data exchange, and/or other actions with each other. In some embodiments, devices 15, 200, may utilize short-range radio technologies (e.g. Bluetooth, ZigBee, etc.) that facilitate communicating over relatively short distances (e.g., meters). Devices 17, 202 (e.g., smartphones), may include these short-range radio technologies and/or be configured to communicate via mid-range radio technologies (e.g. Wi-Fi) that facilitate communication over tens and/or hundreds of meters, for example. In some embodiments, device 17, 202 may be configured to communicate via long-range cellular radio and/or other technologies (e.g., GSM, UMTS, etc.) that facilitate connection to the internet, for example, at any geographic location.

In some embodiments, devices 15, 200 may include sensing and/or processing capability that is similar to and/or the same as the sensing and/or processing capability of devices 17, 202 but may be limited in their memory storage capacity relative to these devices. Devices 17, 202 (e.g., smartphones and/or similar devices) may be capable of storing vast amounts of data and may include a local light profile database 32, 208 as shown FIG. 2. As described above, devices 17, 202 include one or more sensors 19, 210 configured to generate output signals related to geographic location. This location information may be included in the light exposure information as described above. The location information may be used by processor 20 to determine an amount of ambient light exposure experienced by the subject (e.g., the location information may be used to retrieve corresponding light exposure information from a database), stored in local light profile databases 32, 208, stored in central light profile database, and/or used for other purposes. In some embodiments, devices 15, 200 may include one or more sensors (not shown) configured to generate output signals related to geographic location. For example, devices 15, 200 may be and/or include a fitness device that includes a GPS location sensor.

Figure 3:
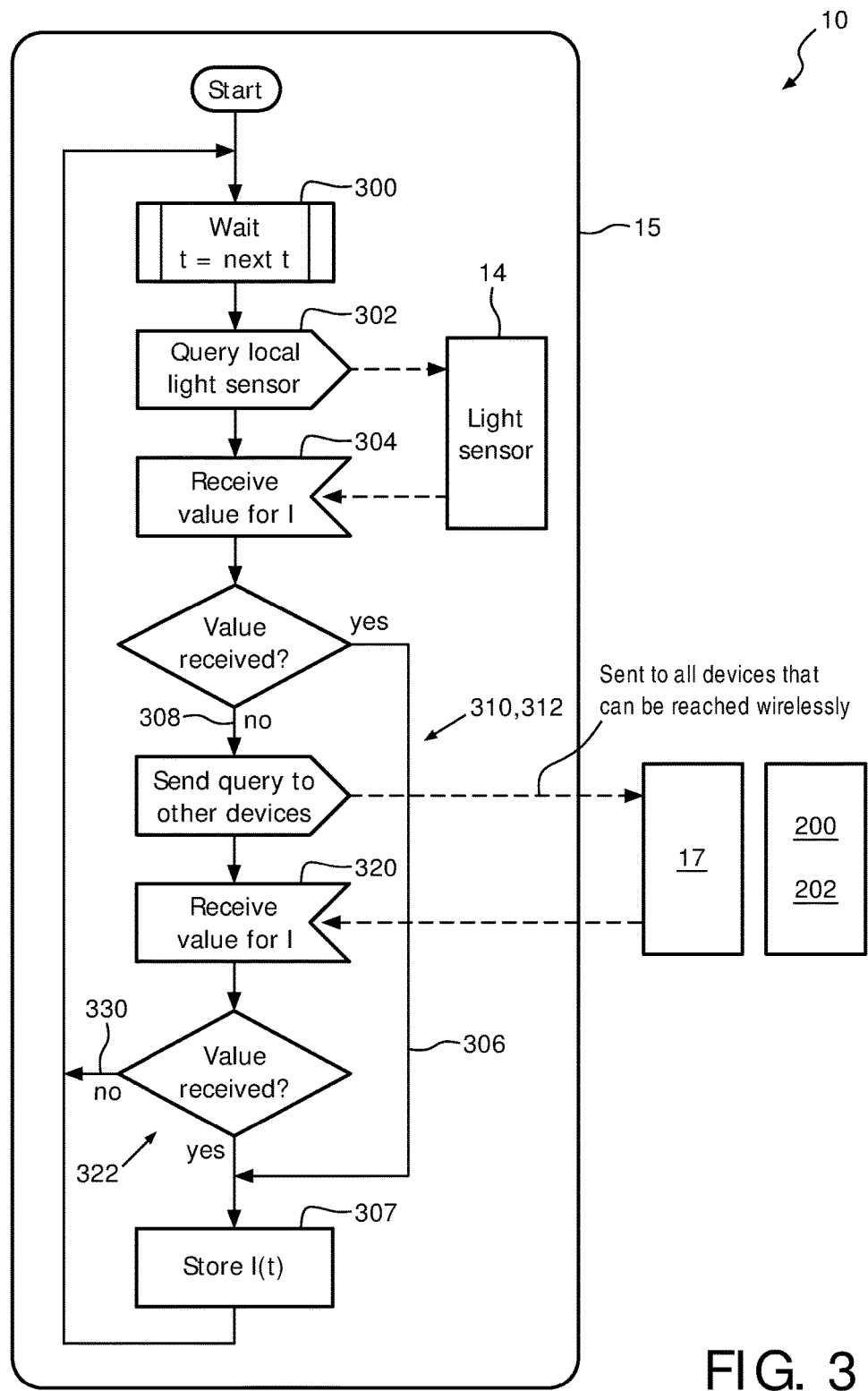
FIG. 3 illustrates a flow chart that describes the system.

FIG. 3 illustrates a flow chart that describes system 10. In the example shown in FIG. 3, processor 20 (not shown) is included in device 15. This is not intended to be limiting. As described above, processor 20 may be included in device 17, partially included in devices 15 and/or 17, and/or included in other components of system 10.

Primary light sensor 14 of device 15 may generate output signals conveying primary light exposure information related to an amount of ambient light to which the primary light sensor is exposed. At a given time 300, processor 20 (not shown) may determine 302 whether sensor 14 is exposed to ambient light. If light sensor 14 was not covered and returned a value (I) for ambient illuminance (for example) 304, the value is stored 306, 307 in local memory (e.g., electronic storage 32) for further processing and system 10 waits for the next given time to determine ambient light exposure. If the light sensor was covered and did not return a value (I) for ambient illuminance 308, processor 20 wirelessly obtains 310 light exposure information from other devices 17 worn by and/or associated with the subject via short-range radio (for example) communication. If no information indicating light exposure is obtained, for example because device 17 was not exposed to ambient illumination, processor 20 obtains 312 light exposure information from light sensors included in devices worn by and/or associated with different users. In some embodiments, processor 20 may obtain 312 light exposure information from substantially all devices in reach simultaneously and/or may first search for devices and then obtain light exposure information in a sequential order based on an individual device's proximity to the subject. Received information 320 is stored 322 in local memory for further processing and system 10 waits for the next given time to determine ambient light exposure. If no information indicating light exposure is received, the process repeats 330.

In some embodiments, obtaining the light exposure information includes requesting the light exposure information from other devices. In some embodiments, the devices that include light sensors may send light exposure information via periodic broadcast messages, (e.g., processor 20 does not request the information, it receives the broadcast messages of nearby devices communicating light exposure information instead).

FIG. 4 illustrates a second flow chart that describes system 10. In the example shown in FIG. 4, processor 20 (not shown) is included in device 17. This is not intended to be limiting. As described above, processor 20 may be included in device 17, included in device 15, partially included in devices 15 and/or 17, and/or included in other components of system 10.

As shown in FIG. 4, at a given time 400, processor 20 may determine 402 location information (L) based on the output signals 404 from sensor 19. This information may include absolute location information, such as GPS coordinates, and/or relative location information such as room numbers in a building and/or cell identifiers in a cellular network. The location information may be used in later steps to request light exposure information that corresponds to a current location of the subject from light profile databases and/or to update these databases with light exposure information generated by a light sensor (e.g., sensor 16).

Processor 20 may determine 406 whether sensor 16 is exposed to ambient light. If light sensor 16 was not covered and returned 408 a value (I) for ambient illuminance (for example), the value is stored 410 in local memory (e.g., electronic storage/local light profile database 32) and/or a central light database (e.g., central light profile database 30) and the device waits for the next given time for obtaining light exposure information. If light sensor 16 was covered and did not return 412 a value (I) for ambient illuminance, processor 20 wirelessly obtains 414 light exposure information from other devices worn by and/or associated with the subject (e.g., device 15 that includes sensor 14) via short-range radio communication (for example) and/or determines the amount of ambient light exposure experienced by the subject for the given time based on the light exposure information from these devices. If the devices worn by and/or associated with the subject are not exposed to ambient light, processor 20 wirelessly obtains 416 light exposure information via short-range radio communication (for example) from the devices 200, 202 of different users and/or determines the amount of ambient light exposure experienced by the subject for the given time based on the light exposure information from these devices. If no light exposure information is obtained in the preceding steps 406, 408, 412, 414, 416, processor 20 wirelessly obtains 418 light exposure information from the light sensing devices 450 of different users using mid-range radio technologies such as Wi-Fi, for example, and/or determines the amount of ambient light exposure experienced by the subject for the given time based on the light exposure information from these devices.

If light exposure information indicates that a given sensor is exposed to ambient light and/or if the amount of ambient light exposure experienced by the subject for the given time is determined during one or more of the steps above, the local light database and/or the central light database is updated 410 with the amount of ambient light exposure experienced by the subject, the location (L), illuminance (I), time of day (t), date, and/or other light exposure information. The information may be uploaded to central light profile database 30 via long-range radio communication, for example. In some embodiments, light exposure information obtained from a sensor may need to be processed before being stored with the other light exposure information. For example, light exposure information obtained from a sensor may need to be interpolated and/or averaged based on previously determined information from the light sensor.

If none of the steps above 406, 408, 412, 414, 416, 418 result in obtaining the current light illuminance (I) and/or other information indicating a given sensor is exposed to ambient light, processor 20 searches 452 the local light database (e.g., electronic storage 32) for illuminance levels that have been stored for the current location (L), the date, and/or the current time of day (t). The date and/or current time of day may be needed to search for light exposure information so that obtained information is representative of and/or corresponds to the location of the subject, the current time of the day, the date, and/or the year. If no light exposure information can be retrieved from the local light profile database (e.g., because the local light profile database does not contain information that corresponds to the location, date, time, etc.), processor 20 communicates 454 via a long-range wireless network (e.g. GSM, UMTS, etc.), for example, to central light profile database 30 and obtains 456 illuminance levels that have been stored for the current location (L) and/or are representative for the current time of day, and/or date. If an illuminance value (I) is retrieved from a database (e.g., steps 452-456), it is used as approximation of the current ambient light levels and stored 410 with the other light exposure information.

Figure 5:
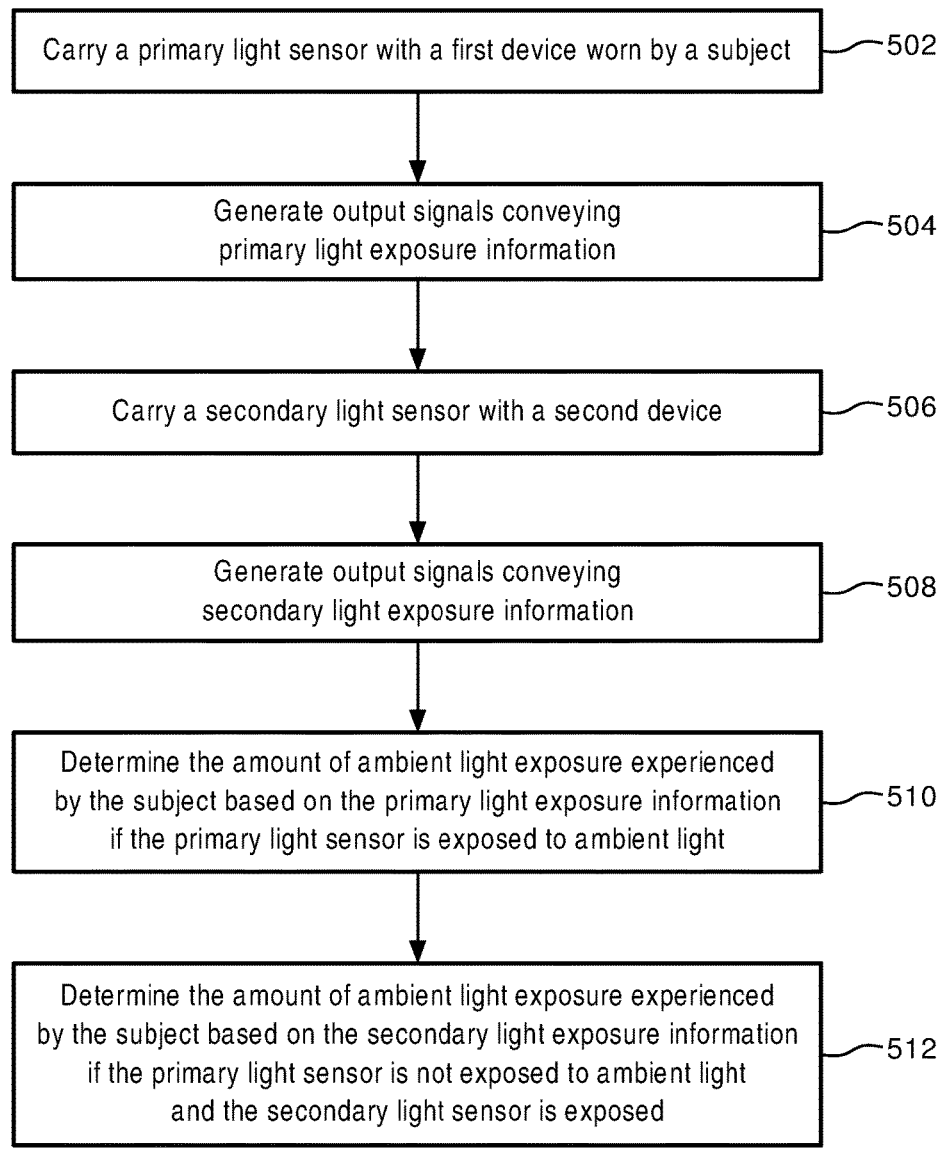
FIG. 5 illustrates a method for determining an amount of ambient light exposure experienced by a subject with a light sensing system.

FIG. 5 illustrates a method 500 for determining an amount of ambient light exposure experienced by a subject with a light sensing system. The system comprises a primary light sensor, a secondary light sensor, one or more physical computer processors, and/or other components. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, the primary light sensor is carried by a first device worn by the subject. In some embodiments, the primary light sensor is carried by one or more of a wristband, earphones, an identification badge, jewelry, a button, a hair band, glasses, a bracelet, a belt, artificial finger nails, a pin, a piercing, a tie, or a clip worn by the subject. In some embodiments, operation 502 is performed by a device the same as or similar to device 15 (shown in FIG. 1 and described herein).

At an operation 504, output signals conveying primary light exposure information may be generated. The primary light exposure information is related to an amount of ambient light to which the primary light sensor is exposed. In some embodiments, operation 504 is performed by a primary light sensor the same as or similar to primary light sensor 14 (shown in FIG. 1 and described herein).

At an operation 506, the secondary light sensor is carried by a second device. The second device may be physically separate and unconnected from the first device. The second device may be associated with the subject. In some embodiments, the second device is a smartphone associated with the subject. In some embodiments, operation 506 is performed by a device the same as or similar to device 17 (shown in FIG. 1 and described herein).

At an operation 508, output signals conveying secondary light exposure information are generated. The secondary light exposure information is related to an amount of ambient light to which the secondary light sensor is exposed. In some embodiments, the secondary (and/or primary) light exposure information includes one or more of an illuminance, a spectrum of the ambient light, an intensity of the ambient light, a date, a time of day, a geographic location of the subject, and/or other information. In some embodiments, operation 508 is performed by a secondary light sensor the same as or similar to secondary light sensor 16 (shown in FIG. 1 and described herein).

At an operation 510, an amount of ambient light exposure for a given time experienced by the subject is determined based on the primary light exposure information for the given time if the primary light sensor is exposed to substantial ambient light. In some embodiments, operation 512 is performed by physical computer processor components that are the same as or similar to exposure component 22 and/or control component 24 (shown in FIG. 1 and described herein).

At an operation 512, the amount of ambient light exposure for the given time experienced by the subject is determined based on the secondary light exposure information if the primary light sensor is not exposed to ambient light and the secondary light sensor is exposed. In some embodiments, operation 512 is performed by physical computer processor components that are the same as or similar to exposure component 22 and/or control component 24 (shown in FIG. 1 and described herein).

The description of a primary and secondary light sensor is not intended to be limiting. The system may be configured to obtain information from one or more additional light sensors and/or light exposure information databases as described herein. For example, the system may comprise a light exposure information database configured to store light exposure information from one or more users. If the secondary (and/or tertiary, etc.) light exposure information for the given time indicates that the secondary light sensor is not exposed to substantial ambient light, the system may obtain light exposure information from the database that corresponds to one or more of a date, a time of day, or a geographic location in the primary and/or secondary light exposure information. The system may determine the amount of ambient light exposure experienced by the subject based on the database light exposure information.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A light sensing system configured to determine an amount of ambient light exposure experienced by a subject, the system comprising:
    a primary light sensor carried by a first device worn by the subject, the primary light sensor being configured to generate output signals conveying primary light exposure information related to an amount of ambient light to which the primary light sensor is exposed;
    a secondary light sensor carried by a second device, the second device being physically separate and unconnected from the first device, and being associated with the subject, the secondary light sensor being configured to generate output signals conveying secondary light exposure information related to an amount of ambient light to which the secondary light sensor is exposed; and
    one or more physical computer processors configured by computer readable instructions to:
    if the primary light exposure information for a given time indicates that the primary light sensor is exposed to a threshold amount of ambient light, determine the amount of ambient light exposure experienced by the subject for the given time based on the primary light exposure information;
    if the primary light exposure information for the given time indicates that the primary light sensor is not exposed to a threshold amount of ambient light, determine the amount of ambient light exposure experienced by the subject for the given time based on the secondary light exposure information; and
    if the secondary light exposure information for the given time indicates that the secondary light sensor is not exposed to a threshold amount of ambient light, determine the amount of ambient light exposure experienced by the subject for the given time based on tertiary light exposure information obtained from light sensors included in devices associated with different users.

2. The system of claim 1, wherein the primary light sensor is included in one or more of a wristband, earphones, an identification badge, jewelry, a button, a hair band, glasses, a bracelet, a belt, artificial finger nails, a pin, a piercing, a tie, or a clip worn by the subject.

3. The system of claim 1, wherein the secondary light sensor is included in a smartphone associated with the subject.

4. The system of claim 1, wherein the one or more physical computer processors are configured such that the primary, secondary, and tertiary light exposure information includes one or more of an illuminance, a spectrum of the ambient light, an intensity of the ambient light, a date, a time of day, or a geographic location of the subject.

5. The system of claim 4, further comprising a light exposure information database configured to store light exposure information from one or more users, wherein the one or more physical computer processors are configured to, if the secondary light exposure information for the given time indicates that the secondary light sensor is not exposed to a threshold amount of ambient light, obtain light exposure information from the database that corresponds to one or more of a date, a time of day, or a geographic location in the primary and/or secondary light exposure information, and determine the amount of ambient light exposure experienced by the subject based on the database light exposure information.

6. The system of claim 4, wherein the one or more physical computer processors are configured such that tertiary light exposure information is obtained from a third light sensor that corresponds to one or more of a date, a time of day, or a geographic location in the primary and/or secondary light exposure information, the third light sensor being worn by, and/or carried by a third device associated with, another user who is not the subject; and determine the amount of ambient light exposure experienced by the subject based on the tertiary light exposure information.

7. A method for determining an amount of ambient light exposure experienced by a subject with a light sensing system, the system comprising a primary light sensor, a secondary light sensor, and one or more physical computer processors, the method comprising:

carrying the primary light sensor with a first device worn by the subject; generating, with the primary light sensor, output signals conveying primary light exposure information related to an amount of ambient light to which the primary light sensor is exposed;

carrying the secondary light sensor with a second device, the second device being physically separate and unconnected from the first device, and being associated with the subject; generating, with the secondary light sensor, output signals conveying secondary light exposure information related to an amount of ambient light to which the secondary light sensor is exposed;

if the primary light exposure information for a given time indicates that the primary light sensor is exposed to a threshold amount of ambient light, determining the amount of ambient light exposure experienced by the subject for the given time based on the primary light exposure information;

if the primary light exposure information for the given time indicates that the primary light sensor is not exposed to a threshold amount of ambient light, determining the amount of ambient light exposure experienced by the subject for the given time based on the secondary light exposure information; and if the secondary light exposure information for the given time indicates that the secondary light sensor is not exposed to a threshold amount of ambient light, determine the amount of ambient light exposure experienced by the subject for the given time based on tertiary light exposure information obtained from light sensors included in devices associated with different users.

8. The method of claim 7, further comprising carrying the primary light sensor in one or more of a wristband, earphones, an identification badge, jewelry, a button, a hair band, glasses, a bracelet, a belt, artificial finger nails, a pin, a piercing, a tie, or a clip worn by the subject.

9. The method of claim 7, further comprising including the secondary light sensor in a smartphone associated with the subject.

10. The method of claim 7, wherein the primary, secondary, and tertiary light exposure information includes one or more of an illuminance, a spectrum of the ambient light, an intensity of the ambient light, a date, a time of day, or a geographic location of the subject.

11. The method of claim 10, wherein the system further comprises a light exposure information database configured to store light exposure information from one or more users, the method further comprising:

if the secondary light exposure information for the given time indicates that the secondary light sensor is not exposed to a threshold amount of ambient light, obtaining light exposure information from the database that corresponds to one or more of a date, a time of day, or a geographic location in the primary and/or secondary light exposure information, and determining the amount of ambient light exposure experienced by the subject based on the database light exposure information.

12. The method of claim 10, wherein a threshold amount of the tertiary light exposure information is obtained from a third light sensor that corresponds to one or more of a date, a time of day, or a geographic location in the primary and/or secondary light exposure information, the third light sensor being worn by, and/or carried by a third device associated with, another user who is not the subject; and determining the amount of ambient light exposure experienced by the subject based on the tertiary light exposure information.

13. A light sensing system configured to determine an amount of ambient light exposure experienced by a subject, the system comprising:

primary means, carried by a first device worn by the subject, for generating output signals conveying primary light exposure information related to an amount of ambient light to which the primary means is exposed;

secondary means, carried by a second device, the second device being physically separate and unconnected from the first device, and being associated with the subject, for generating output signals conveying secondary light exposure information related to an amount of ambient light to which the secondary means is exposed;

means for, if the primary light exposure information for a given time indicates that the primary means is exposed to a threshold amount of ambient light, determining the amount of ambient light exposure experienced by the subject for the given time based on the primary light exposure information;

means for, if the primary light exposure information for the given time indicates that the primary means is not exposed to a threshold amount of ambient light, determining the amount of ambient light exposure experienced by the subject for the given time based on the secondary light exposure information; and means for, if the secondary light exposure information for the given time indicates that the secondary light exposure is not exposed to a threshold amount of ambient light, determining the amount of ambient light exposure experienced by the subject for the given time based on tertiary light exposure information obtained from light sensors included in devices associated with different users, wherein the light exposure information is obtained in a sequential order based on the proximity of the devices associated with the different users.

14. The system of claim 13, wherein the primary means for generating output signals conveying primary light exposure information is included in one or more of a wristband, earphones, an identification badge, jewelry, a button, a hair band, glasses, a bracelet, a belt, artificial finger nails, a pin, a piercing, a tie, or a clip worn by the subject.

15. The system of claim 13, wherein secondary means for generating output signals conveying secondary light exposure information is included in a smartphone associated with the subject.

16. The system of claim 13, wherein the primary secondary, and tertiary light exposure information includes one or more of an illuminance, a spectrum of the ambient light, an intensity of the ambient light, a date, a time of day, or a geographic location of the subject.

17. The system of claim 16, further comprising means for storing light exposure information from one or more users, and means for, if the secondary light exposure information for the given time indicates that the secondary means is not exposed to a threshold amount of ambient light, obtaining database light exposure information from the means for storing that corresponds to one or more of a date, a time of day, or a geographic location in the primary and/or secondary light exposure information, and determining the amount of ambient light exposure experienced by the subject based on the database light exposure information.

18. The system of claim 16, further comprising means for a threshold amount of obtaining tertiary light exposure information from a tertiary means that corresponds to one or more of a date, a time of day, or a geographic location in the primary and/or secondary light exposure information, the tertiary means being worn by, and/or carried by a third device associated with, another user who is not the subject; and determining the amount of ambient light exposure experienced by the subject based on the tertiary light exposure information.

* * * * *